Nov. 6, 1951 W. S. BLACKINTON 2,574,240
LATHE ATTACHMENT FOR CUTTING SPHERICAL SHAPES
Filed June 13, 1947 2 SHEETS—SHEET 1
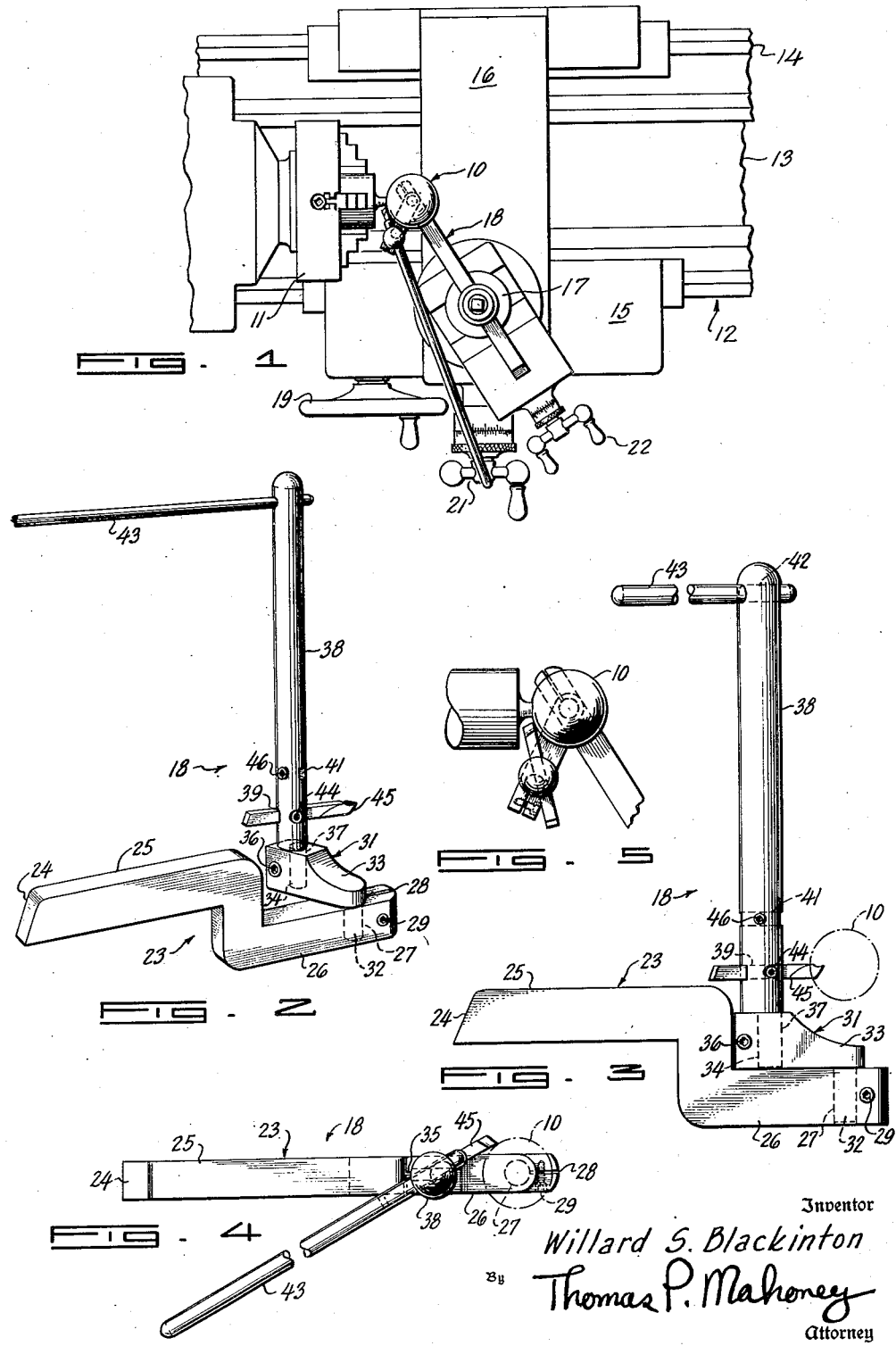
Inventor
Willard S. Blackinton
By Thomas P. Mahoney
Attorney

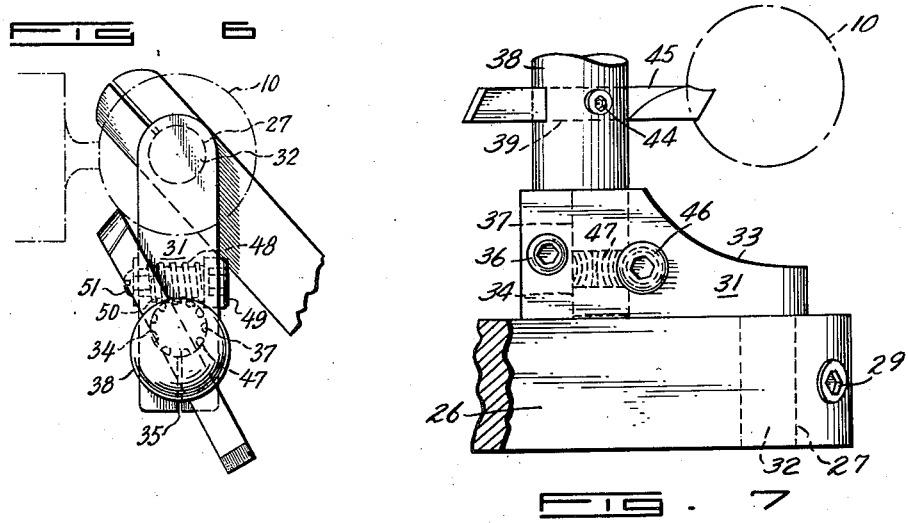
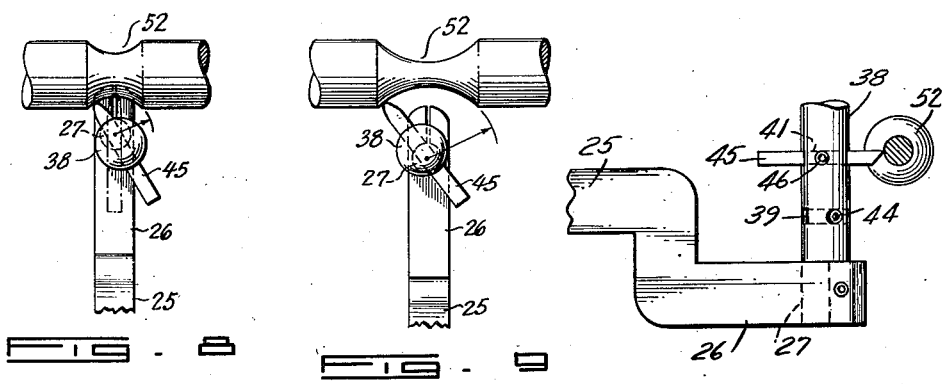
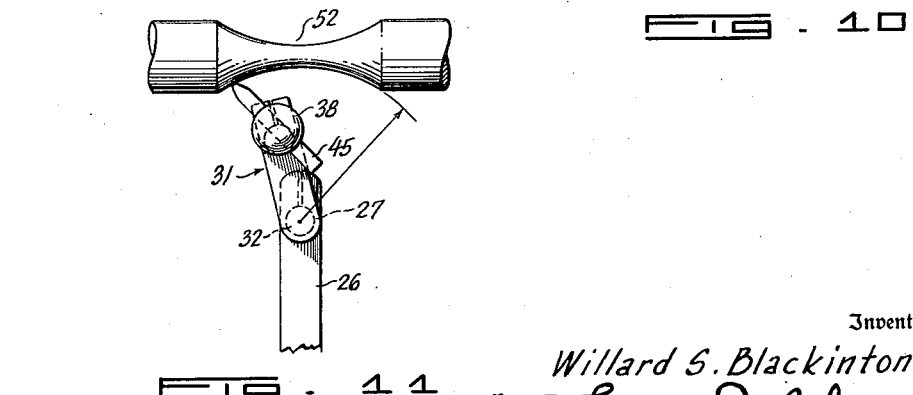

Patented Nov. 6, 1951

2,574,240

UNITED STATES PATENT OFFICE 2,574,240

LATHE ATTACHMENT FOR CUTTING SPHERICAL SHAPES

Willard S. Blackinton, La Mesa, Calif.

Application June 13, 1947, Serial No. 754,544

2 Claims. (Cl. 82—12)

This invention relates to improvements in machine lathe attachments and more particularly to a simple attachment designed to facilitate the cutting of spherical, concave and convex shapes.

In the past a wide variety of devices designed to cut such shapes has been developed but they have been so massive in construction and high in cost that the average lathe owner has not felt the purchase of such attachments would be feasible.

In addition, most of these prior art devices were so constructed and designed that their very bulk and complexity of parts precluded their being utilized in turning a work-piece close to the face of the chuck, which resulted in it being necessary to use longer pieces of stock so that the required cuts could be made. Therefore, short, pieces of stock and random lengths which would be most useful in turning spheres could not be used with the prior art devices.

Many of the devices are limited to the cutting of either convexities or concavities and require the purchase of an additional attachment to permit them to cut both. Further, some of the prior art attachments are encumbered with adjusting mechanisms which are required because of the method of construction and mode of operation of the devices.

Nearly all of the prior art attachments embrace a large number of component parts and since they do are high in cost and rather cumbersome to use.

It is, therefore, one object of this invention to provide a lathe attachment for cutting spheres and concavities which is so constructed that the cuts may be taken much closer to the chuck face than is possible at the present time with conventional attachments designed to perform this type of work. The facility with which shapes may be cut in the metal close to the face of the chuck permits short lengths of material to be utilized, which is an economy, and makes for more rigid mounting of the work-piece which is a contributing factor in producing more accurate work.

Another object of the present invention is the provision of a lathe attachment for cutting concavities and convexities which is composed of a minimum number of parts and whose mode of operation is exceedingly simple and uncomplicated.

A further object of the invention is the provision of a lathe attachment for cutting concavities and convexities which has embodied therein provisions for permitting smaller or larger cuts to be made by the use of a very simple adjustment means.

An additional object of the invention is the provision of a lathe attachment for cutting concavities and convexities in which the tool bit approaches the work-piece tangentially when spheres are cut and a cut can thus be made which will be little more than the thickness of the tool away from the face of the chuck supporting the work-piece. The substantially tangential mounting of the tool bit permits the completion of a sphere to a point where it drops off the work-piece, virtually complete, without any interference between any part of the attachment or the tool bit itself and the lathe chuck.

A further object of the invention is the provision of a lathe attachment for cutting convexities and concavities which may be cheaply and easily manufactured and which is adaptable for use on a wide variety of lathes.

Other objects and advantages of the present invention will be ascertained by a consultation of the specification and the accompanying drawings, in which:

Figure 1 is a top plan view of the present invention shown in the process of cutting a sphere;

Figure 2 is a vertical elevational view of the present invention;

Figure 3 is a side elevational view of the present invention;

Figure 4 is a top plan view of the present invention;

Figure 5 is a detailed view showing a tangential cut being taken in the work-piece;

Figure 6 is a top plan view of a detail which shows an alternate method of adjusting the tool post in the present invention;

Figure 7 is a side elevational view showing a detail of the alternate tool post adjusting mechanism;

Figure 8 is a top plan view showing the manner in which the tool post may be adjusted in the frame to permit a small concavity to be cut;

Figure 9 shows another method of adjusting the tool post to permit a still larger concavity to be cut;

Figure 10 is a side elevational view of the tool post adjustment shown in Figure 9; and Figure 11 shows the manner of mounting the tool post in the radius arm when exceptionally large cuts are to be made.

As shown in the drawing (Figure 1) the work-piece (a sphere) 10 is mounted for rotation in the chuck 11 of a lathe 12 which has a bed 13 equipped with ways 14 and a carriage 15 mounted on said ways for longitudinal movement thereupon. Supported upon the carriage 15 is a cross slide 16 which supports a compound slide tool post or holder 17 which is adapted to receive the lathe attachment 18 which is the subject of the present invention. The carriage 15 is adapted to be moved along the ways 14 by the manipulation of wheel 19 and cross slide 16 is adapted to be fed across the longitudinal axis of the carriage 15 and at right angles thereto by means of the handle 21. The angular adjustment of the compound slide tool post or tool holder 17 is controlled by the manipulation of handle 22.

The lathe attachment 18, which is the subject of the present invention comprises an elongated mounting arm or frame 23 one end 24 of which is adapted to be inserted in and secured within compound slide tool post 17. The elongated mounting arm or frame 23 is substantially rectangular in cross section and comprises a straight portion 25 and a joggled or lowered portion 26. A hole or orifice 27 is formed adjacent the forward end of the lowered portion 26 of the mounting arm 23 and has communicating therewith a vertical slot 28 which is cut backwards from the forward end of lowered portion 26 until it communicates with hole 27. A cap screw or other tightening means 29 is inserted in a hole which traverses the slot 28 and serves when tightened to reduce the diameter of hole 27 and when loosened to enlarge the diameter of hole 27. The cap screw 29 and slot 28 in combination serve to regulate closeness of fit of radius arm 31 which is mounted for rotation in the hole 27 through the medium of a cylindrical boss 32 formed integrally with radius arm 31 and projecting downwardly from its base.

Radius arm 31 is substantially rectangular in cross section but has a forward dished-out section 33 the narrowest part of which is subtended by cylindrical boss 32. Rearward of the dished-out section 33 of radius arm 31 is formed a vertical hole 34 which has a vertical slot 35 communicating therewith and the rear end of radius arm 31. A cap screw or similar type fastener 36 is inserted in a hole formed transversely of the slot 35. Cap screw 36 is adapted to constrict or distend the slot 35 and in combination therewith forms a means for enlarging or reducing the diameter of the hole 34.

Mounted in the hole 34 as by means of a downwardly projecting cylindrical boss 37 is a vertical, cylindrical tool post 38. Cylindrical boss 37 is formed eccentrically of the central axis of cylindrical tool post 38 for a purpose to be described below. Formed transversely to the vertical axis of the tool post 38 are two tool bit receiving holes 39 and 41. Lower hole 39 is so positioned that its transverse axis is to one side of the vertical axis of eccentrically positioned cylindrical boss 37 and upper hole 41 has its horizontal axis coinciding with vertical axis of cylindrical boss 37. The purpose of so disposing the tool bit receiving holes will be described below. Near the extreme upper end of the tool post 38 is formed a hole 42 in which is received and retained a feed handle or tool bit advancing means 43. Associated with the tool bit receiving hole 39 is a set screw 44 adapted to retain tool bit 45 fixedly therein. The tool bit receiving hole 41 has a similar set screw 46 associated therewith to serve a similar purpose.

Shown in Figures 6 and 7 is a modification which is designed to permit the more accurate control of tool post 38 as it is turned upon radius arm 31. As indicated below the radius arm has a hole 34 formed therein with a vertical slot 35 communicating with said hole whose dimensions are controlled by the movement of cap screw 36. The cylindrical boss 37 upon which tool post 38 is mounted has a worm gear 47 cut in its periphery which is adapted to be actuated by means of a worm 48 cut into cap screw 49. Cap screw 49 is maintained within the bore of hole 50 by means of a screw and washer assembly 51.

The lathe attachment, when used in cutting convexities or spheres, employs the radius arm 31 mounted in frame 23. The tool post 38 is mounted in the radius arm 31 and as shown in Figures 2-5, the tool bit 45 is mounted in the lower tool-mounting hole 39 and secured therein by the use of set screw 44. The metal to be formed, which, as mentioned above, may be of short or random length, is secured within the chuck 11. The cross slide 16 is advanced in order to bring the radius arm 31 under the piece to be cut and is so positioned that the vertical axis of cylindrical boss 32 of radius arm 31 is positioned directly below and at right angles to the longitudinal central axis of the work-piece 10. Thus positioning the vertical axis of cylindrical boss 32 directly below the longitudinal axis of work-piece 10 assures that an equal cut will be taken on all sides as the sphere is cut and assures that the formation of an elliptical or out-of-round shape will not result. The tool bit 45 is then brought up against the surface of the work-piece 10 and the radius arm 31 rotated on boss 32 to permit the tool bit 45 to be drawn about the work-piece 10 to assure that an accurate cut will be made.

The lathe is then started and as the first cut is completed a wrench or similar instrument is inserted between the rear end of the radius arm 31 and the joggled portion 26 of frame or mounting arm 23 in order to lock and prevent rotation of radius arm 31. The tool post 38 is then frictionally rotated upon the radius arm 31 by means of the tool post feed handle 43 to permit the tool bit 45 to take another cut of smaller radius from the work. At all times the approach of the tool bit 45 to the work-piece is substantially tangential and, as can be seen from Figure 5, it is this tangential approach which permits the cut to be taken behind the work-piece 10 so close to the face of the chuck. It is here that the essential distinction between the manner in which the tool bit 45 of the present invention approaches the work and the manner in which the tool bit of a conventional attachment of this type approaches the work is most clearly in evidence. As those familiar with the art know, most tools are fed to the work in an arc. The tool bits are carried laterally across the face of the work with the resultant limitation that the tool bit or tool post strikes the face of the chuck before its traverse is completed and the work must be rechucked before additional cuts can be made. In the present invention the tool bit is fed to the work endwise, in a path substantially in the direction of the longitudinal axis of the tool bit. Thus, when a cut must be made in the back of the work-piece only the tip of the tool is interposed between the work-piece and the chuck and a cut can be made very close to the face of the chuck. As was indicated above, the cylindrical boss 37 is eccentrically positioned in regard to the central axis of the tool post 38 and it is possible by merely rotating the post 38 to facilitate the cutting of a much smaller sphere by bringing the tool bit 45, which has been reversed in the mounting hole 39, closer to the work-piece. It is therefore obvious that the utilization of the attachment is exceedingly simple and can be mastered by anyone familiar with the action of a lathe in a few moments.

However, for those who might desire a finer control of the movement of the tool post 38 in the radius arm 31, there is provided the construction shown in Figures 6 and 7. When the need for successive cuts arises an internal wrench is merely inserted in the head of cap screw 49. The wrench is turned causing the worm 48 to rotate the worm gear 47 formed on the cylindrical boss 37 of tool post 38. By utilizing this alternate construction, it is obvious that a finer degree of control may be obtained than by using the adjustment method described above.

As indicated above, the attachment can also be utilized in cutting a wide variety of concavities with only a few minor adjustments. When utilized in cutting the smallest size concavities the tool bit 45 is inserted in the upper hole 41 and the tool post 38 is disengaged from its mounting in the radius arm 31. Since the tool bit mounting hole is formed with its horizontal axis running directly across the vertical axis of the eccentrically positioned boss 37 of tool post 38, it is obvious that the 180° rotation of the tool post will make a considerable difference in the size of the cut made. As shown in Figure 8, the tool post 38 is mounted directly in the hole 27 in the mounting arm 23. The rotation of the tool post 38 on the mounting arm 23 will permit a concavity to be cut in the metal. Since the smallest concavity is being cut the eccentrically positioned boss 37 of tool post 38 is positioned with its inner periphery in its near position to the workpiece 52. In Figure 9 the attachment is shown as utilized in making a larger cut. The tool post has been rotated into its outer position and, as can be seen from the drawing, a larger cut can be made.

To make the largest concave cut of all, the radius arm 31 is brought into action once again and mounted in its customary position on the frame 23. The tool bit 45 is inserted in the lower tool bit mounting hole 39 and a very wide concave cut can be made, as seen in Figure 11.

There has been described above for the purpose of illustrating the manner of construction and mode of operation of the present invention one embodiment thereof. It is, of course, not intended to limit the invention to the specific details disclosed since it is obvious that changes may be made in the details of construction which will still fall within the scope of the appended claims.

I claim:

1. A device designed to be used in conjunction with a lathe comprising a frame, a radius arm pivotally mounted in one end of said frame, a tool post rotatably secured in said radius arm, and eccentrically positioned cylindrical boss providing the mounting means for said tool post, a tool bit mounted in said tool post and means associated with said tool post to cause the rotation of said tool post and its associated tool bit to permit successive cuts to be taken in a rotatably mounted work-piece.

2. A lathe attachment for cutting spherical shapes comprising a frame to be supported by the lathe, an elongated radius arm, a downwardly projecting integral portion provided at one end of said radius arm for rotatably supporting said radius arm upon said frame, an elongated tool post carried by said radius arm with the vertical axis thereof positioned at right angles to the longitudinal axis of said radius arm, boss means provided on an end of said tool post eccentric to the vertical axis of the tool post and projecting downwardly therefrom to be rotatably carried by said radius arm adjacent the free end thereof, said tool post having a transverse opening provided therethrough, a tool bit having a cutting edge at one end, said tool bit extending into said opening to be supported upon said tool post, and means carried by said tool post for rotation thereof.

WILLARD S. BLACKINTON.

REFERENCES CITED

The following references are of record in the file of this patent:

UNITED STATES PATENTS

| Number | Name | Date |
| --- | --- | --- |
| 1,655,027 | Sokol | Jan. 3, 1928 |
| 1,979,252 | Chedester | Nov. 6, 1934 |
| 2,132,835 | Stevens | Oct. 11, 1938 |
| 2,435,212 | Golden | Feb. 3, 1948 |

FOREIGN PATENTS

| Number | Country | Date |
| --- | --- | --- |
| 326,102 | Germany | Sept. 24, 1920 |